Aug. 31, 1948.  A. P. DRIGGS  2,448,087
BUNNY-CAT
Filed Nov. 9, 1945
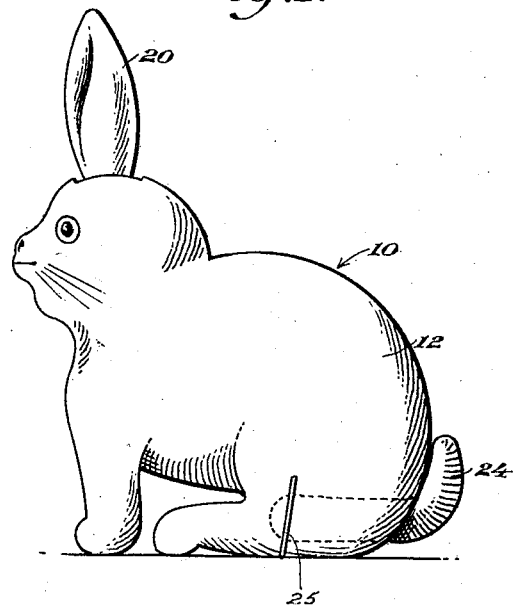
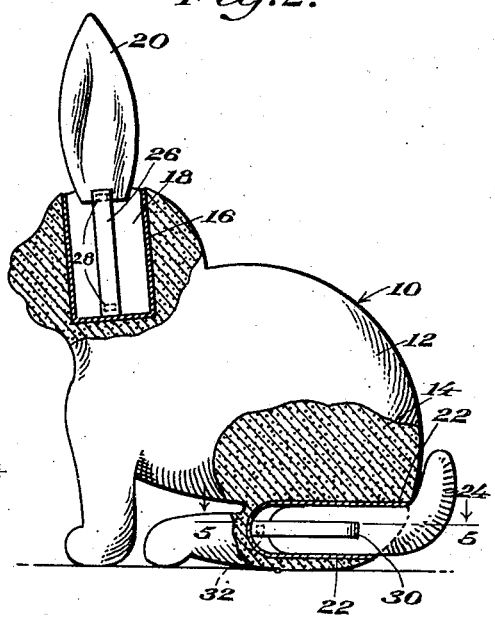
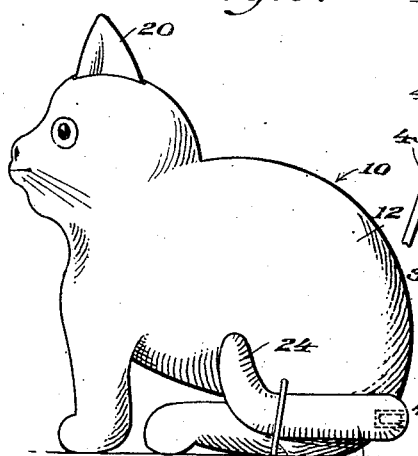
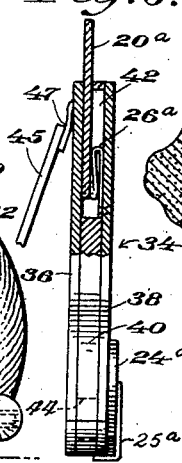
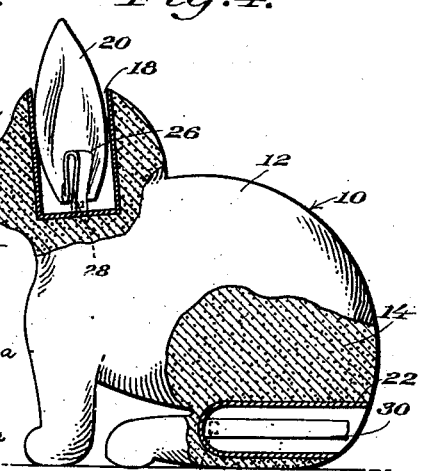
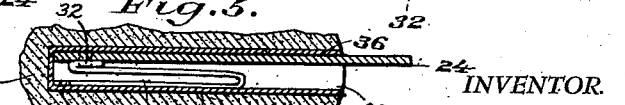
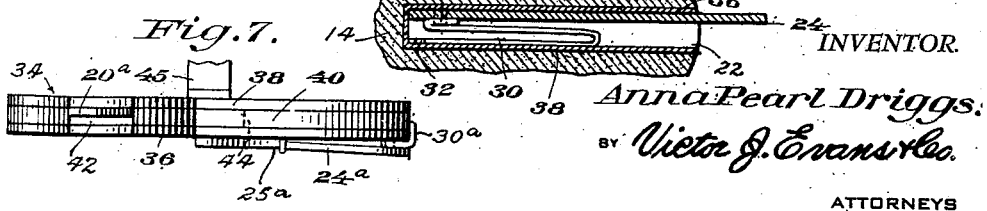
INVENTOR.
Anna Pearl Driggs.
BY Victor J. Evans & Co.
ATTORNEYS Patented Aug. 31, 1948

2,448,087

UNITED STATES PATENT OFFICE 2,448,087

BUNNY-CAT

Anna Pearl Driggs, Colfax, Calif.

Application November 9, 1945, Serial No. 627,608

5 Claims. (Cl. 46—151)

This invention relates to a toy animal and one of its objects is to provide an animal figure which by various means later to be described can be altered to simulate a rabbit or a cat.

Another object of the invention is to provide a toy animal having means for adjusting the length of the ears and tail thereof.

A further object of the invention is to provide a toy animal that is simple in operation, can be inexpensively manufactured and sold at a reasonable cost.

With these and other objects and advantages in view, the invention consists of the novel details of construction, arrangement and combination of parts more fully hereinafter described, claimed and illustrated in the accompanying drawings, in which:

Figure 1 is an elevational view of an embodiment of the invention showing the position of the ears and tail when the animal simulates a rabbit;

Figure 2 is the same, partly broken away, to show the operating elements thereof;

Figure 3 is an elevational view of the animal when it simulates a cat;

Figure 4 is the same, partly broken away, to show the operating elements thereof;

Figure 5 is a sectional view on the line 5—5 of Figure 2;

Figure 6 is a rear view of a modified form of the invention, partly in section, and Figure 7 is a top plan veiw of the modified form.

Referring more in detail to the drawings and in particular to Figures 1 to 5 inclusive, the numeral 10 depicts an animal body which except for the position of the ears and tail would resemble in appearance a cat or a rabbit. To simulate a rabbit, the ears and tail will assume the positions shown in Figure 1, and to simulate a cat, the ears and tail will assume the positions shown in Figure 3.

In this form of the invention, the body 10 of the animal is made of cloth having a heavy nap, or fur-like cloth 12, and is stuffed with cotton, sawdust, fibre or similar material 14. The body 10 is provided with a straight sided slotted recess 16 having a pocket 18 therein for reception of the ears 20 and the straight recess and pocket 22 therein at the rear portion thereof for the reception of the tail 24.

The outward movement of the ears 20 is limited by the tape 26, which is fastened to the lower end of the ears 20 and the side 16 by fastening means 28. The ears 20 are held in the extended position by the frictional engagement of the sides of the ears with the longitudinal edges of the slot. The tail is limited in the same manner by a tape 30 fastened to the inner end of the tail 24, and the side 16 by fasteners 32.

The body 34 in Figures 6 and 7 can also be made of cardboard, wood, compressed paper or similar materials and is painted on the outside to depict an animal employing eyes, whiskers and other form depicting configurations are applied.

The body 34 comprising similar sections 36 and 38 and the spacer 40 and the ear 20ª and tail 24ª are made of the materials previously mentioned and the spacer 40 provides pockets 42 and 44 for reception of the ears 20ª and tail 24ª, respectively. The tail 24 and pocket 44 are slightly curved in this form of the invention. The ear 20ª and tail 24ª are connected to the body of the toy by flexible members 26ª and 30ª, respectively.

If, as in Figure 1, the animal is to simulate a rabbit, the ears 20 are pulled outward to the full limit of movement and the tail 24 is pushed into its respective recess or pocket. In Figure 3, the ears 20 are pushed inward and the tail 24 is pulled outward and retained in the position shown in Figure 3 by means of the loop 25, which may be made of elastic, cord or similar materials.

When the paper type of body shown in Figures 6 and 7, is used, a prop 45 is swingably connected to one side of the body by the hinge member 47 and the prop will support the body in an upright position when it is used.

There is thus provided a toy animal which by its peculiar structure can be made to simulate a rabbit or a cat and it is believed that the operation thereof will be clear to those skilled in the art from the foregoing description when taken in conjunction with the drawings accompanying the specification.

It is also to be understood that various changes in materials, combinations and arrangements of the various parts can be indulged in provided they fall within the spirit of the invention and the scope of the appended claims.

Having thus described the invention, what is claimed as new and desired to be secured by Letters Patent is:

1. A figure toy, comprising a body having flat sides, spacing means intermediate said sides having slotted pockets therein, movable ears and tail in said pockets and tapes connected to said ears and tail for limiting the movement thereof within said pockets.

2. A figure toy comprising a body, a head forming an integral part of the body and provided with a recess opening through the upper side of the head, and an ear mounted in the recess for sliding movement inwardly or outwardly with relation to the head whereby to extend a large or small portion of the ear beyond the head.

3. A figure toy as described in claim 2, additionally comprising a flexible member located within the recess and terminally secured to the body and ear, said member limiting the outward movement of the ear with respect to the head.

4. A figure toy as described in claim 2, additionally comprising a tail, the body being provided with a recess for the reception of a portion of the tail, the tail being adapted to be entirely withdrawn from the recess and positioned against a side of the body, means for releasably securing the tail in such position, and a flexible member located within the recess and terminally secured to the body and tail.

5. A figure toy comprising a body, a head forming an integral part of the body, an ear, a tail, hollow members secured within the head and rear portion of the body for the reception of portions of the ear and tail, the remaining portions of the ear and tail extending beyond the body in positions to be seen, and the ear and tail being adapted to move outwardly to expose greater portions thereof to view, and members secured to the hollow members and to the ears and tail to limit the outward movement thereof.

ANNA PEARL DRIGGS.

REFERENCES CITED

The following references are of record in the file of this patent:

UNITED STATES PATENTS

| Number | Name | Date |
| --- | --- | --- |
| 1,591,661 | Dinsdale | July 6, 1926 |